United States Patent [19]

Aures et al.

[11] Patent Number: 4,466,407
[45] Date of Patent: Aug. 21, 1984

[54] IGNITION PULSE AND CRANKSHAFT ANGLE PULSE GENERATOR AND DISTRIBUTOR COMBINATION

[75] Inventors: Reinhard Aures, Eggenstein; Jörg Bonitz, Mühlacker; Robert Entenmann, Benningen; Rochus Knab, Kornwestheim; Siegfried Rohde, Schwieberdingen; Herbert Schramm, Stuttgart, all of Fed. Rep. of Germany

[73] Assignee: Robert Bosch GmbH, Stuttgart, Fed. Rep. of Germany

[21] Appl. No.: 416,590

[22] Filed: Sep. 9, 1982

[30] Foreign Application Priority Data

Sep. 18, 1981 [DE] Fed. Rep. of Germany ....... 3137181

[51] Int. Cl.³ .............................................. F02P 5/14
[52] U.S. Cl. ............................ 123/425; 123/146.5 A; 123/613; 123/617
[58] Field of Search ................ 123/146.5 A, 613, 617, 123/425

[56] References Cited

U.S. PATENT DOCUMENTS

| | | | |
|---|---|---|---|
| 3,783,314 | 1/1974 | Kostan | 123/146.5 A |
| 3,807,378 | 4/1974 | Wernet, Jr. | 123/613 |
| 3,923,029 | 12/1975 | Polo | 123/617 |
| 4,307,698 | 12/1981 | Yoshinari | 123/146.5 A |
| 4,367,721 | 1/1983 | Boyer | 123/146.5 A |
| 4,370,965 | 2/1983 | Grossner et al. | 123/146.5 A |
| 4,406,272 | 9/1983 | Kiess et al. | 123/146.5 A |

FOREIGN PATENT DOCUMENTS

| | | | |
|---|---|---|---|
| 2744035 | 4/1979 | Fed. Rep. of Germany | 123/146.5 A |
| 136284 | 6/1979 | Fed. Rep. of Germany | 123/146.5 A |
| 27710 | 3/1978 | Japan | 123/425 |

*Primary Examiner*—Parshotam S. Lall
*Attorney, Agent, or Firm*—Frishauf, Holtz, Goodman & Woodward

[57] ABSTRACT

To provide a signal representative of angular crankshaft position from an ignition distributor, independently of change of ignition timing, the ignition distributor includes a further or additional rotating transducer system (8, 9, 10, 11), for example a rotating disk (8) positively coupled to the shaft (3) of the distributor. The disk (8) carries markers (10) which are picked up by an optic, magnetic (Hall generator) or inductive pick-up (9). To provide a reference marker output, for example a reference, e.g. TDC position of a reference piston, the rotating disk (8) can carry an additional reference marker (10a) picked up by a reference pick-up (9a) which can be similar to the other pick-ups used in the construction. The specific crankshaft position signals are especially suitable and desirable if the engine is coupled to an engine knock sensing and knock prevention system (KS).

8 Claims, 1 Drawing Figure

U.S. Patent  Aug. 21, 1984  4,466,407
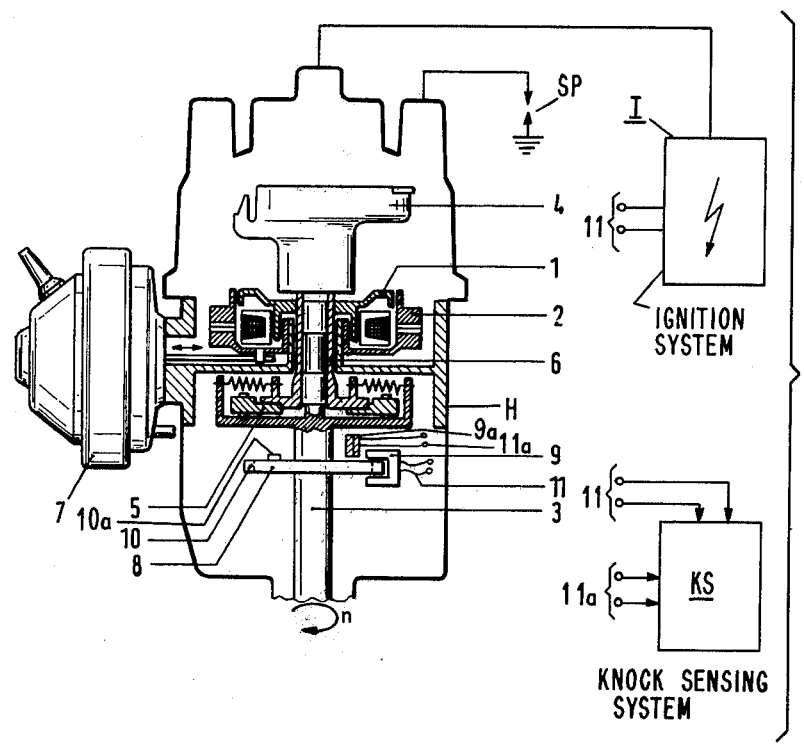

IGNITION PULSE AND CRANKSHAFT ANGLE PULSE GENERATOR AND DISTRIBUTOR COMBINATION

Reference to related patent and application, the disclosure of which is hereby incorporated by reference, assigned to the assignee of the present invention:

U.S. Pat. No. 3,744,466, July 10, 1973, BRAMMER et al.

U.S. Ser. No. 398,651, filed July 15, 1982, BRAMMER et al. entitled "OTTO ENGINE IGNITION PULSE GENERATOR AND DISTRIBUTOR" (Attorney docket FF 82196-shf; R. 7224).

The present invention relates to an automotive-type distributor, ignition pulse and crankshaft angle pulse generator, and more particularly to a distributor-ignition pulse combination which, additionally, provides output signals suitable for signal processing and relates to crankshaft angle position independently of ignition timing, for example for use in an engine knock sensing and control system.

BACKGROUND

Many modern ignition distributors for use with internal combustion engines provide contactless signaling transducer elements or generators constructed, for example, in the form of induction generators or magnetic elements using a Hall semiconductor device. The outputs from these transducers are used as control signals for the ignition sparks. The exact adjustment of ignition sparking can be carried out electronically or, very simply, mechanically by using a vacuum diaphragm chamber to provide ignition timing adjustment in dependence on loading on the engine, and a centrifugal adjustment element which changes the ignition timing, independently of loading, based on speed of the engine. The centrifugal adjustment device can be located within the distributor-pulse generator combination.

If the ignition timing is not in accordance with design requirements, and particularly if the ignition timing is too advanced, the engine may be subjected to knocking or pinging. Knocking or pinging is caused by pulse waves occurring upon combustion of the fuel-air mixture which can be heard as oscillations of the engine at audible frequencies. Pinging or knocking should be avoided since it places heavy thermal loading on the inner walls of the combustion chamber of the cylinder and the adjacent surfaces of the piston, which may lead to degradation of the surfaces, removal of material therefrom, and otherwise, particularly upon extended occurrence of pinging, to damage of the engine.

It is desired to operate the engine as close as possible to its maximum power design output level and, thus, to operate the engine just below the characteristic timing of the ignition at which pinging or knocking might result. Of course, by detuning the timing, that is, by always retarding the timing beyond the optimum setting, pinging or knocking can be avoided. To obtain maximum power output, however, it is desirable to so operate the engine that it is just below the knocking limit and, hence, it is necessary to rapidly and reliably determine knocking or tendency to destructive knocking of the engine.

Sensing knocking, so that the continuous operation under knocking condition can be avoided, requires suitable transducers. The transducers must provide output signals of such characteristics that knocking oscillations occurring in the IC engine can be reliably distinguished from noise or other disturbance background signals. Accordingly, it has been proposed to measure signals for knocking recognition only during a strobing interval, that is, during a measuring window or measuring time interval which is so arranged that it falls within a predetermined angular range of position of the crankshaft, so that the particular position of the piston within the cylinder, which is determined by the angular position of the crankshaft, can be associated with the strobing interval or the measuring window. It has been proposed to determine the strobing interval or the measuring window by deriving a signal from the ignition control signals. It has been found that this has the disadvantage that the ignition signal does not always occur synchronously with respect to a predetermined angular position of the crankshaft, due to the aforementioned adjustment for speed and loading of the engine.

THE INVENTION

It is an object to provide a simple and reliable combined ignition pulse generator, distributor, and signaling source which provides output signals definitely associated with a predetermined angular position of the engine crankshaft.

Briefly, there is provided an ignition distributor of standard construction which, for example, has a distributor shaft, coupled to rotate with the crankshaft of the engine, a sleeve thereon surrounding the shaft and rotating therewith but additionally rotatable with respect thereto, and a centrifugal controller coupled to the shaft as well as to the sleeve, to rotate with the shaft and the sleeve and change the relative angular position of the sleeve and the shaft in dependence on engine speed; the sleeve is coupled to the rotating part of a pulse generator, for example, a magnetic rotating diaphragm-type ring which periodically interrupts a control flux to a fixed pick-up located in the housing, the position of which, however, may be adjustable in accordance with loading of the engine, as controlled by a vacuum diaphragm, for example. The flux may be optical, and the diaphragm interrupting an optical path; or it may be magnetic, and the diaphragm either providing a shield or not between a magnet and a Hall generator or, for example, providing pulses for an inductively coupled pick-up.

In accordance with the invention, and in order to provide pulses positively associated with a predetermined crankshaft position of the engine, and which are not subject to change based on loading and/or speed, a second rotating part is provided, directly coupled to the shaft of the distributor, without the interposition of the sleeve, and coupled to a stationary pick-up, preferably by a non-contacting coupling element, such as optical coupling or electromagnetic coupling via an inductive pick-up, or magnetic coupling via a Hall generator.

The combined unit has the advantage that it can carry out the assigned functions of providing ignition pulses, the timing of which is adjustable, in accordance with speed and/or loading on the engine while, additionally, providing an output signal which is positively associated with a predetermined piston position of a reference piston or, in other words, a predetermined angular position of the crankshaft of the engine. The output signals can be used, for example, for recognition of knocking, in a knock sensing system which has an input terminal, as a strobe signal to provide a specific measuring window or measuring interval occurring phase-synchronously and speed-synchronously with rotation of the engine. This substantially improves the reliability of such a knock signal prevention system, and is particularly effective during changes in speed of the engine, for example during acceleration, when the ignition timing may vary with respect to top-dead-center (TDC) position of the piston, while pinging or knocking may occur.

The system permits, additionally, recognition of the crankshaft position with respect to a particular cylinder or piston by placing a second track or recognition marker on the second or additionally rotating part, coupled to a further pick-up, the additional marker passing the stationary pick-up only once during each revolution of the crankshaft, so that a signal positively identifying a particular reference cylinder can, additionally, be obtained.

DRAWING

The single FIGURE is a schematic longitudinal sectional view through an ignition distributor of standard construction, having a centrifugal timing adjustment as well as a vacuum diaphragm ignition timing adjustment associated therewith, and further including the pulse source in accordance with the present invention.

The ignition distributor has a housing H, within which a distributor shaft 3 is journalled, in accordance with any suitable and standard construction. The distributor shaft is coupled to a distributor rotor 4 from which ignition pulses are distributed to respective spark plugs of a multi-cylinder internal combustion (IC) engine, not shown. The shaft 3 is coupled to rotate with the crankshaft of the engine, as schematically indicated by the arrow n. The shaft 3 is coupled to a rotating disk 1 in form of a diaphragm which is, in turn, coupled to a receiver or stationary element 2. The respective position of the stationary element 2 within the housing can be changed by sensing change in intake manifold vacuum in a vacuum diaphragm chamber 7, which moves an operating rod back and forth, as schematically indicated by the double-arrow. A centrifugal timing adjustment device 5 is provided, for example in accordance with known and suitable standard construction, which rotates with the shaft 3, and thus is capable of changing ignition timing in dependence on the engine speed n. A sleeve 6 surrounds the shaft 3, likewise coupled to the centrifugal ignition adjustment device 5 to change the position of the diaphragm disk 1 with respect to the shaft 3 in dependence on operating speed of the shaft, so that the sleeve 6, and with it the disk 1, as well as the rotor 4 are angularly shifted with respect to the ignition distributor shaft 3. The disk 1 has markers, marking elements, openings, or other discontinuities thereon which, in dependence on the relative twist of the sleeve 6 and hence of the disk 1 with respect to the shaft 3 changes the ignition timing so that the discontinuities will pass the pick-up 2 slightly earlier or slightly later than a predetermined reference position in order to advance or retard, respectively, the timing of ignition sparks in ignition system I.

The diaphragm adjustment chamber 7 changes the ignition timing in dependence on loading on the engine or, respectively, engine power output. Due to the change of the timing of the spark, based on engine speed and engine loading, the occurrence of ignition pulses will change with respect to a predetermined crankshaft angle of the engine crankshaft as operating conditions change.

In accordance with the invention, and in order to provide a strobing signal or a measuring or timing window or timing signal which will be synchronous with a predetermined angle, with respect to a reference, of the crankshaft of the engine, an additional rotating element 8, for example in form of a disk similar to the disk 1, and an additional pick-up 9, for example similar to the pick-up 2, is provided located in staggered relation with respect to the elements 1, 2, the rotating element 8 being positively coupled to rotate with the shaft 3. Thus, looked at in the direction of the shaft 3, upwardly from its coupling to the crankshaft of the IC engine: first, the additional rotating element 8 and pick-up 9 are placed, and thereafter the centrifugal adjustment element 5, the sleeve 6, and the load or vacuum adjustment element 7.

The disk or diaphragm element 8 has markers 10 on it which, for example, cooperate with a Hall generator or an inductive pick-up; they may also be so arranged that they cooperate with an optical pick-up. The disk 8 may be formed, for example, with openings which permit passage of a light beam or which periodically interrupt or couple, respectively, a magnetic field. The stationary pick-up 9 is connected to electrical supply lines 11 for connection to terminals of a knock sensing system (KS). The openings or markings 10 of the second disk or diaphragm 8 are transformed or transduced by the pick-up 9 into an electrical signal which can be used as a measuring window signal, as a strobing signal, or as a timing signal, always associated with a predetermined fixed position of the crankshaft of the engine, regardless of actual ignition timing.

In some systems, it is desirable to be able to associate the signals from the terminals 10 with a predetermined cylinder-piston combination of a multi-cylinder engine. In order to be able to determine which one of the cylindersreaches a reference position, for example TDC with ignition, a further marker 10a can be located on the second disk or diaphragm 8, for example in form of an additional opening 10, an enlargement, an additional magnetic element, or the like. The additional marker 10a is interrogated by a third pick-up 9a located radially to sense the particular marker 10a, and transducing the occurrence of the marker 10a in front of the pick-up 9a into an electrical signal which can be taken off the transducer 9a at terminals 11a.

Various changes and modifications may be made within the scope of the inventive concept.

The drawing, additionally, schematically shows an ignition system I, and a single spark plug SP connected to the pulse generator and distributor combination, and receiving inputs from output connections of the element 2; as well as a knock sensing system KS receiving inputs from terminals 11 and 11a.

We claim:

1. An ignition pulse and crankshaft pulse generator and distributor combination having a housing (H);

a distributor shaft (3) coupled to rotate with the crankshaft of the engine;

a sleeve (6) surrounding the shaft, rotating therewith, and further rotatable with respect thereto;

a centrifugal controller (5) coupled to the shaft and to the sleeve for adjusting ignition timing as a function of engine speed by changing the relative angular position of the sleeve and of the shaft;

and means for providing ignition pulses having a rotating part (1) coupled to the sleeve (6), and a stationary part (2) located within the housing, and further comprising, in accordance with the invention, means for providing a signal representative of the angular position of the crankshaft of the engine with respect to reference positions, said positions indicating respectively a beginning and an end of an engine knocking recognition time window, including means for providing angle-representative pulses having a second rotating part (8) coupled to positively rotate with the shaft (3), a second stationary part (9) secured in the housing;

and electrical output connection means (11) connected to the stationary part.

2. Combination according to claim 1, wherein the second rotating part (8) carries a first track (10) having markings thereon, and the second stationary part is responsive to said markings to provide output signals representative of predetermined angular positions of the shaft (3) and hence of the crankshaft of the engine.

3. Combination according to claim 2, wherein the second rotating part (8) carries an additional marker (10a);

and an additional stationary part forming an additional marker transducer is provided, furnishing an output signal representative of a reference position of the shaft (3) and hence of the crankshaft of the engine to associate the output from the stationary part with a particular cylinder of the engine.

4. Combination according to claim 1, wherein said rotating parts and stationary parts comprise a transducer system.

5. Combination according to claim 4, wherein the transducer system is an optical system.

6. Combination according to claim 4, wherein the transducer system is a magnetic transducer system including a Hall generator.

7. Combination according to claim 4, wherein the transducer system is an electromagnetic system, and the stationary part comprises an inductive pick-up.

8. Combination according to claim 1, for combination with a knock signal evaluation system (KS) comprising means (11, 11a) connecting the second stationary part (9, 9a) to said evaluation system.

* * * * *